INVENTOR.
Walter J. Denkowski

INVENTOR.
Walter J. Denkowski
BY
Paul + Paul
ATTORNEYS.

United States Patent Office 3,523,599
Patented Aug. 11, 1970

3,523,599
LINEAR ACTUATOR WITH TORQUE CONTROL
Walter J. Denkowski, King of Prussia, Pa., assignor to King of Prussia Research and Development Corporation, King of Prussia, Pa., a corporation of Pennsylvania
Filed July 15, 1969, Ser. No. 841,868
Int. Cl. H01h *15/14*
U.S. Cl. 192—150
5 Claims

ABSTRACT OF THE DISCLOSURE

A linear actuator, such as a screw jack, is driven by a worm and worm gear nut. When the jack exerts a preselected amount of thrust or torque, the reaction on the worm causes it to move axially, thereby moving a lever arm to actuate a switch to shut off the driving motor. Adjustable compression spring means are provided for opposing the axial reaction movement of the worm, thereby to accommodate the jack for widely different loads and conditions.

BACKGROUND OF THE INVENTION

The present invention relates to machine screw jacks, ball screw jacks, and other load lifting or load handling devices driven by a worm and worm gear nut. The invention relates particularly to a linear actuator, such as a screw jack, having means responsive to the output torque for mechanically opening an electrical switch to shut off the power to the driving motor in the event a selected amount of output torque is produced or exceeded.

SUMMARY OF THE INVENTION

An object of the present invention is to provide a linear actuator of the type described immediately above having means for adjusting the sensitivity or response of the device to output thrust or output torque so that a single device may be adapted to widely varying load requirements and conditions.

The foregoing object is achieved, in accordance with the present invention, by providing adjustable compression spring means for opposing the reaction movement of the worm to torque or thrust forces, thereby to adjustably control the movement of an actuating arm which mechanically actuates the electrical switch which shuts off the driving motor.

DESCRIPTION OF THE PREFERRED EMBODIMENT

Figure 1:
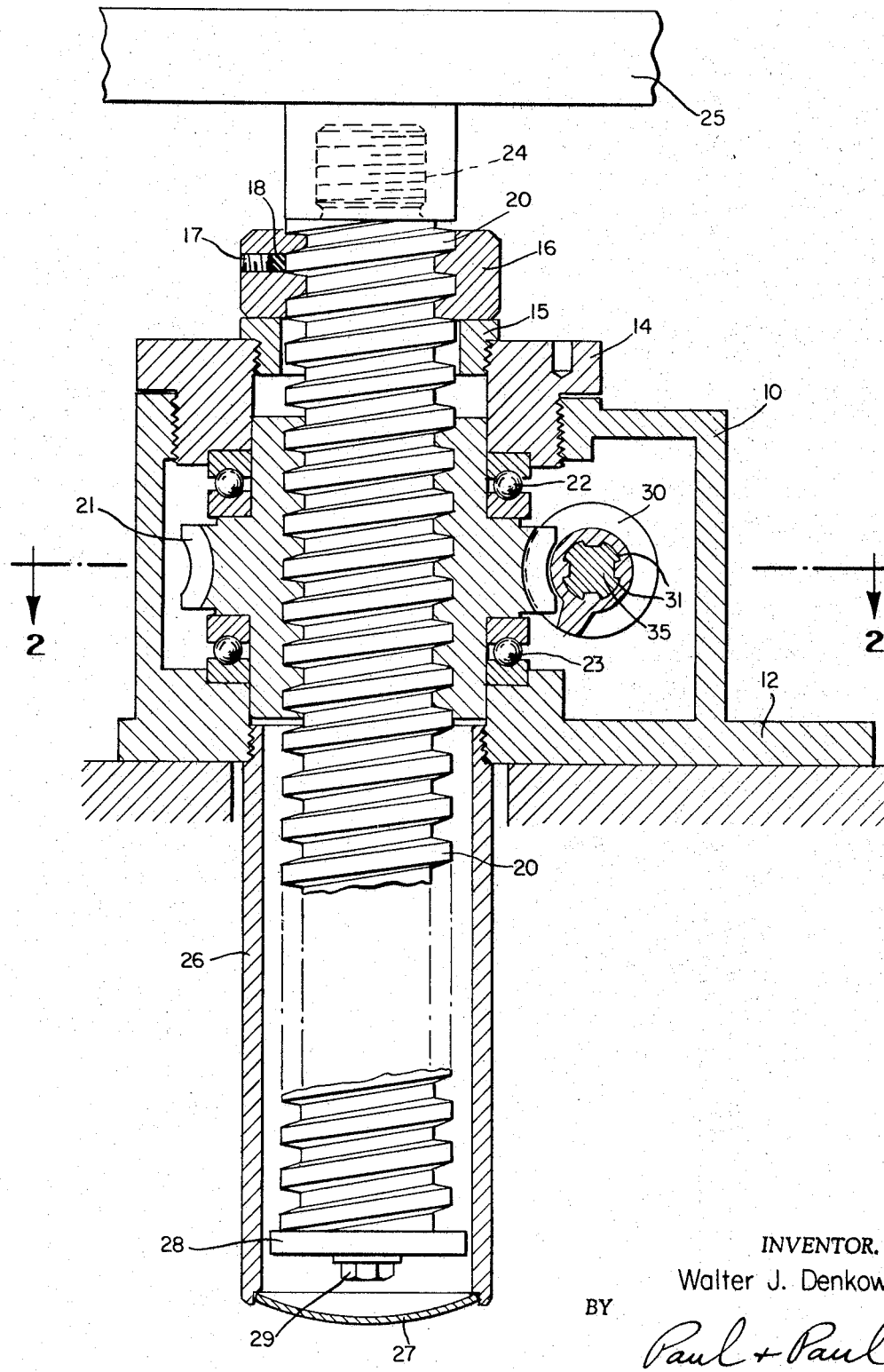
FIG. 1 is an elevational view in section of a machine screw jack taken along the line 1—1 of FIG. 2.

Referring to FIG. 1, a machine screw jack is shown supported in a drive housing 10 having a base 12, a collar 14 threaded into the neck of the housing, an annular plug 15, and a nut 16 which functions as a stop collar. The position of the externally threaded load stem 20 relative to the stop collar 16 is adjustable by means of set screw 17 and insert 18. It is assumed that the load is so fixed as to prevent the lifting stem 20 from turning on its own axis.

The non-rotating lifting stem 20 is supported and driven axially in one direction or the other by a nut 21 driven by a worm 30. The nut 21 is supported for rotation in the housing 10 on bearings 22 and 23. The upper end of the lifting stem 20 is shown threaded at 24 for receiving a load attachment which in the illustrated embodiment is a top plate 25.

The lower portion of the stem 20 below the base 12 of the drive housing 10 is covered by a cover 26 having an end plug 27. The lower end of the stem 20 is shown provided with a stop washer 28 secured by a screw 29.

Figure 2:
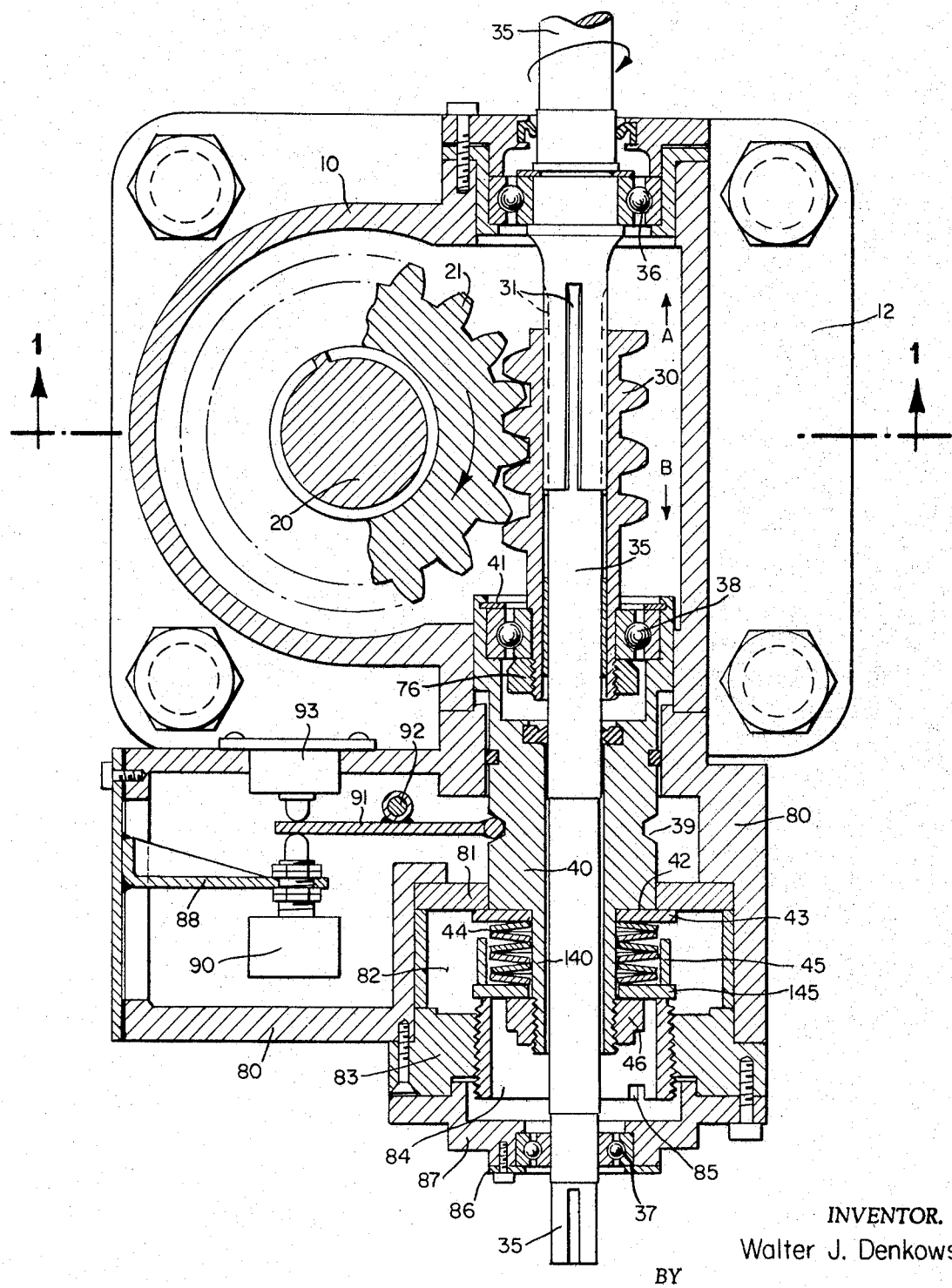
FIG. 2 is a plan view in section looking down along the line 2—2 of FIG. 1 showing the adjustable compression means in accordance with the present invention.

Referring now to FIG. 2, the input or worm shaft 35 is driven by a motor not shown. The worm 30 is slidably mounted on the worm shaft 35, as by keyway and keys 31, so as to allow the worm 30 to move axially relative to the worm shaft 35 in response to torque reaction forces. The shaft 35 is shown supported for rotation on bearings 36, 37 and 38 suitably mounted and retained.

The worm 30 is connected to one end of a cartridge 40 through the bearings 38, a nut 76 and a retainer 41. The cartridge 40 extends along the worm shaft 35 and projects from the main housing 10 into a torque-switch control housing 80. The end portion 140 of the cartridge 40 is of reduced diameter forming a shoulder 42.

Fitted over the reduced end portion 140 of the cartridge 40 and abutting against the shoulder 42 is an annular retaining plate or washer 43. The diameter of washer 43 is larger than that of the cartridge 40 and the outer peripheral portion of washer 43 abuts against an annular back plate 81 which is set into a recess 82 in the torque-switch control housing 80. A set of heavy compression springs 44, preferably Belleville spring washers, are mounted on the reduced end portion 140 of the cartridge 40 and retained by an annular retaining thrust washer 145. The retaining thrust washer 145 is held by a nut 46 which is threaded on to the end of the cartridge 40.

The recess 82 in the housing 80 is provided with an annular member 83 secured as by bolts to the housing 80. The annular member 83 is internally threaded and receives an externally threaded cap or plug 84 the end of which is provided with sockets 85 for receiving a suitable tool for turning the plug 84 in the member 83, thereby to adjust the preload deflection of the Belleville spring washer set 44.

As seen in FIG. 2, the inner end of the cap plug 84 abuts against the thrust washer 145 and accordingly, the Belleville spring washer unit 44 can be compressed to a greater or to a lesser extent according to adjustment of the cap plug 84.

To adjust the preload on the spring set 44 by means of the cap plug 84, the end cap assembly 87 is removed, and then, if the compression of the Belleville spring washer unit 44 is to be increased, the plug 84 is turned in a direction to move the thrust washer 145 away from the nut 46 and in a direction toward the other retaining plate 43. The nut 46 is then screwed in to reach the thrust washer 145. Of course, if the compression of the Belleville spring washer unit is to be decreased, rather than increased, the nut 46 must first be unscrewed away from washer 145, before plug 84 is turned in a direction to allow the spring to move thrust washer 145 in a direction away from plate 43. The function of the sleeve or spacer 45 is to prevent the Belleville spring washer set 44 from going solid when actuated.

Mounted on an arm 88 in the torque-switch control housing 80 is a microswitch 90 adapted to be actuated by one end of a lever arm 91 which is pivotally mounted on a pin 92. The other end of the arm 91 projects into an annular recess 39 of the cartridge 40 so that when the cartridge 40 is moved axially relative to the worm shaft 35 the lever arm 91 is moved pivotally about the pivot pin 92.

The operation of the linear actuator illustrated in FIGS. 1 and 2 will now be briefly described. Assume that the driving motor (not shown) is driving the worm shaft 35 in the direction indicated by the arrow in FIG. 2, thereby rotating the nut 21 clockwise as indicated by the arrow. This causes the load stem 20 to rise, as viewed in FIG. 1. As the thrust or torque load on stem 20 increases it obviously becomes increasingly difficult for worm 30 to rotate nut 21. When a preselected load value is reached the nut 21 will refuse to turn further and the worm 30 will be cammed slidingly along the shaft 35, causing worm 30 to move axially along the shaft 35 in the direction of the arrow A. Since worm 30 is secured to the cartridge 40 through the bearing 38, movement of the worm 30 in the direction of the arrow A will pull the cartridge 40 in the same direction. As a result, the Belleville spring washer unit 44 will be further compressed. Such further compression occurs because the retaining nut 46 moves with the cartridge 40 and pushes the thrust washer 145 toward the retaining washer 43 which is unable to move in the direction of the arrow A because its outer periphery abuts against the fixed stop or back plate 81 of the housing 80.

When the cartridge 40 moves in the direction of the arrow A, as just described, the lever arm 91 is pivoted in a counterclockwise direction, as viewed in FIG. 2, about the pivot pin 92, and the outer end of the arm 91 presses against the microswitch 90 shutting off the power to the motor drive.

The device shown in FIGS. 1 and 2 has torque control for both directions of movement of the stem 20. When the motor drive rotates the input shaft 35 in the direction opposite of that indicated by the arrow in FIG. 2, the nut 21 is driven counterclockwise, as viewed in FIG. 2, and the load stem 20 is moved downwardly. When, for example, the load screw 20 reaches its limit position in the downward direction, the thrust and torque forces developed will exceed the preselected values and as a result of the reaction forces exerted thereagainst the worm 30 will tend to be cammed slidingly along the shaft 35 in the direction of the arrow B. As a result, the cartridge 40 will tend to move in the same direction, thereby moving the retaining plate or washer 43 away from the shoulder of back plate 81. This causes further compression of the Belleville spring washer unit 44, since the thrust washer 145 is prevented from moving in the direction of the arrow B by the cap plug 84. When the cartridge 40 moves in the direction of the arrow B, as just described, the lever arm 91 will be rotated in a clockwise direction on pivot pin 92 and the end of the lever arm 91 will push against the other microswitch 93 to shut off the drive motor.

As already indicated, the screw jack shown in FIGS. 1 and 2 of the drawing is adapted to accommodate to a relatively wide variety of expected thrust and torque load conditions by reason of its capability of adjustably controlling the amount of force available to oppose the sliding movement of the worm 30 on the shaft 35 in response to the reaction forces developed as a result of the worm's attempt to rotate the nut 21. The capability of the device of the present invention to adjust to different load conditions has made the unit substantially more attractive from a sales point and also from the standpoint of the user, since a single jack rather than two or more, may be employed for a variety of requirements.

While the invention has been illustrated as applied to a screw jack, it is obviously applicable to other forms of linear actuators.

What is claimed is:
1. A linear actuator comprising;
(a) a housing;
(b) a load shaft externally threaded;
(c) a nut rotatable on said load shaft;
(d) support means supporting said nut in said housing against movement in the axial direction of said load shaft;
(e) a rotatable worm shaft;
(f) a worm mounted for sliding movement on said worm shaft and rotatable therewith;
(g) a cartridge slidable on said worm shaft;
(h) means connecting said worm to an end of said cartridge;
(i) compression spring means carried on said cartridge;
(j) first and second retaining means carried on said cartridge and retaining said compression spring means therebetween;
(k) first limit stop means fixed in said housing to prevent movement of said first retaining means beyond said first limit stop means in one axial direction relative to said worm shaft but allowing movement in the opposite direction;
(l) second limit stop means secured to said housing to prevent movement of said second retaining means beyond said second limit stop means in said opposite axial direction relative to said worm shaft but allowing movement in said one direction;
(m) means for adjusting the axial position of said second stop means relative to said worm shaft;
(n) electrical switch means mounted in said housing,
(o) lever means supported in said housing having one end coupled to said cartridge and having its other end in a position to actuate said electrical switch means whereby movement of said cartridge relative to said worm shaft moves said lever arm in a direction to actuate said electrical switch.

2. Apparatus according to claim 1 characterized in that said means for adjusting the axial position of said second stop means relative to said worm shaft comprises:
(a) a fixed housing member having a threaded bore;
(b) an externally threaded plug in said bore.

3. Apparatus according to claim 2 characterized in that
(a) said cartridge has an end portion of reduced diameter,
(b) said compression spring means are carried on said reduced-diameter portion of said cartridge,
(c) said first and second retaining means are annular members carried on said reduced-diameter portion.

4. Apparatus according to claim 3 characterized in that
(a) at least said first retaining means has a diameter smaller than that of said cartridge,
(b) said first limit stop means is adapted to be engaged by the outer portion of said annular first retaining means.

5. Apparatus according to claim 4 characterized in that said compression spring means are a set of dished washers.

References Cited

UNITED STATES PATENTS

| | | | |
|---|---|---|---|
| 1,479,178 | 1/1924 | Harvey | 318—475 |
| 2,317,490 | 4/1943 | Simpson | 192—150 XR |
| 2,407,537 | 9/1946 | Chapman | 192—150 XR |
| 2,484,616 | 10/1949 | Dulaney | 192—150 XR |
| 2,493,591 | 1/1950 | Newton | 192—150 XR |
| 2,683,848 | 7/1954 | Schmitter | 318—475 |
| 2,945,925 | 7/1960 | Gessell | 192—150 |

MARK M. NEWMAN, Primary Examiner

A. D. HERRMANN, Assistant Examiner

U.S. Cl. X.R.

200—47; 318—475; 74—425